United States Patent
Borthakur et al.

(10) Patent No.: US 7,272,606 B2
(45) Date of Patent: Sep. 18, 2007

(54) SYSTEM AND METHOD FOR DETECTING AND STORING FILE CONTENT ACCESS INFORMATION WITHIN A FILE SYSTEM

(75) Inventors: Dhrubajyoti Borthakur, San Jose, CA (US); Nur Premo, San Jose, CA (US); Joseph Pasqua, Menlo Park, CA (US)

(73) Assignee: Veritas Operating Corporation, Cupertino, CA (US)

( * ) Notice: Subject to any disclaimer, the term of this patent is extended or adjusted under 35 U.S.C. 154(b) by 474 days.

(21) Appl. No.: 10/723,729

(22) Filed: Nov. 26, 2003

(65) Prior Publication Data

US 2005/0114406 A1 May 26, 2005

(51) Int. Cl.
*G06F 17/30* (2006.01)

(52) U.S. Cl. .......................................... 707/10; 707/3

(58) Field of Classification Search ................ 707/1–3, 707/10, 100, 102, 200, 104.1; 709/217, 224, 709/225; 711/147
See application file for complete search history.

(56) References Cited

U.S. PATENT DOCUMENTS

| | | | |
|---|---|---|---|
| 6,026,474 A | | 2/2000 | Carter et al. |
| 6,121,974 A | * | 9/2000 | Shaw .......................... 345/582 |
| 6,240,401 B1 | * | 5/2001 | Oren et al. .................... 705/40 |
| 6,240,429 B1 | | 5/2001 | Thornton et al. |
| 6,286,013 B1 | | 9/2001 | Reynolds et al. |
| 6,389,538 B1 | | 5/2002 | Gruse et al. |
| 6,970,866 B1 | | 11/2005 | Pravetz et al. |
| 2001/0025311 A1 | * | 9/2001 | Arai et al. ................... 709/225 |
| 2002/0049731 A1 | | 4/2002 | Kotani |
| 2002/0055942 A1 | * | 5/2002 | Reynolds ..................... 707/200 |
| 2002/0099952 A1 | * | 7/2002 | Lambert et al. ............. 713/200 |
| 2003/0093556 A1 | | 5/2003 | Yeung et al. |
| 2003/0115433 A1 | * | 6/2003 | Kodama ..................... 711/162 |
| 2003/0151633 A1 | | 8/2003 | George et al. |
| 2003/0154271 A1 | | 8/2003 | Baldwin et al. |
| 2003/0172368 A1 | * | 9/2003 | Alumbaugh et al. ........ 717/106 |
| 2004/0002942 A1 | | 1/2004 | Pudipeddi et al. |
| 2004/0059866 A1 | | 3/2004 | Patel et al. |

(Continued)

OTHER PUBLICATIONS

U.S. Appl. No. 10/723,704, filed Nov. 26, 2003.

(Continued)

*Primary Examiner*—Uyen Le
(74) *Attorney, Agent, or Firm*—Meyertons Hood Kivlin Kowert & Goetzel, P.C.; B. Noël Kivlin; Anthony M. Petro

(57) ABSTRACT

In one embodiment, a system may include a storage device configured to provide a storage space for data storage and a file system configured to map files to the storage space for storage and to manage application accesses to the storage device. The file system may be configured to determine a signature of a first file stored on the storage device dependent upon at least a portion of the first file, detect an operation to access content of the first file, where the operation is generated by an application distinct from the file system, and, subsequent to detecting the operation, store a record of the operation associated with the first file, where the record includes a signature corresponding to the first file, information indicating the operation type and information identifying the application.

27 Claims, 7 Drawing Sheets

U.S. PATENT DOCUMENTS

| | | |
|---|---|---|
| 2004/0225730 A1 | 11/2004 | Brown et al. |
| 2005/0015461 A1 | 1/2005 | Richard et al. |
| 2005/0038813 A1 | 2/2005 | Apparao et al. |
| 2005/0114363 A1 | 5/2005 | Borthakur et al. |
| 2005/0114381 A1 | 5/2005 | Borthakur et al. |
| 2006/0004759 A1 | 1/2006 | Borthakur et al. |
| 2006/0004787 A1 | 1/2006 | Borthakur et al. |

OTHER PUBLICATIONS

Gifford, et al, "Semantic File Systems", *Proceedings of the 13th ACM Symposium on Operating Systems Principles*, Oct. 1991, Pacific Grove, CA, 10 pages.

Yeh, et al, "Using Program and User Information to Improve File Prediction Performance," *Proceedings of the International Symposium on Performance Analysis of Systems and Software (ISPASS '01)*, pp. 111-119, Nov. 2001, IEEE, Tucson, AZ.

Vogels, "File Systems Usage in Windows NT 4.0", Symposium on Operating Systems Principles 17, Dec. 1999, Kiawah Island, SC, pp. 93-109.

"The Business Rationale for Distributed (Remote) Document Capture," Verity White Paper, Oct. 2003, downloaded from http://www.cardiff.com/cms/groups/public/documents/collateral/mk0535.pdf, 12 pages.

"Native XML Management With Documentum," Documentum Technical White Paper, Jul. 2003, downloaded from http://www.software.emc.com/collateral/content_management/documentum_family/wp_tech_xml.pdf, 15 pages.

Autonomy XML White Paper, Oct. 2003, downloaded from http://www.autonomy.com/content/downloads/White%20Papers/index.en.html, 11 pages.

Autonomy Technology White Paper, Nov. 2003, downloaded from http://www.autonomy.com/content/downloads/White%20Papers/index.en.html, 19 pages.

"DCMI Abstract Data Model," Dublin Core Metadata Initiative, Feb. 2004, downloaded from http://www.ukoln.ac.uk/metadata/dcmi/abstract-model/2004-02-04/, 17 pages.

Staples et al., "The Fedora Project: An Open-source Digital Object Repository Management System," in D-Lib Magazine, v. 9, No. 4, Apr. 2003, downloaded from http://web.archive.org/web/20040203065018/www.dlib.org/dlib/april03/staples/04staples.html, 12 pages.

Wildermuth, "A Developer's Perspective on WinFS: Part 1," Mar. 2004, downloaded from http://web.archive.org/web/20050414063209/http://msdn.microsoft.com/data/winfs/default.aspx?pull=/library/en-us/dnwinfsta/html/winfsdevpersp.asp, 10 pages.

\* cited by examiner

SYSTEM AND METHOD FOR DETECTING AND STORING FILE CONTENT ACCESS INFORMATION WITHIN A FILE SYSTEM

BACKGROUND OF THE INVENTION

1. Field of the Invention

This invention relates to computer systems and, more particularly, to storage systems.

2. Description of the Related Art

Computer systems often process large quantities of information, including application data and executable code configured to process such data. In numerous embodiments, computer systems provide various types of mass storage devices configured to store data, such as magnetic and optical disk drives, tape drives, etc. To provide a regular and systematic interface through which to access their stored data, such storage devices are frequently organized into hierarchies of files by software such as an operating system. Often a file defines a minimum level of data granularity that a user can manipulate within a storage device, although various applications and operating system processes may operate on data within a file at a lower level of granularity than the entire file.

In many conventional file-based computer systems, files may be created, destroyed and manipulated with relatively few constraints. Typically, files may be arbitrarily named, subject to operating system conventions, and often, unlimited numbers of exact copies of existing files may be made with ease, subject only to available storage capacity. While such ease of data proliferation may simplify system operation for the user, it may also result in inefficient use of storage devices. For example, storage devoted to multiple identical copies of a given file may be redundant and therefore wasted. Further, if a user creates multiple copies of a given file, gives each a unique identity, and then proceeds to work with each file individually, the relationships among files (such as their common origin, type, and degree of common content) may be obscured over time. Still further, not all types of files may be equally well suited to a given type of storage available in a system. For example, recently used data files may be more likely to be used again in the future and therefore good candidates to be stored in faster storage such as a disk drive, but files unlikely to be used again may be better suited to be stored on a tape drive.

Attempting to track file operations as they occur, to thereby gather greater information about such operations, is complicated by the problem of how such operations may be detected. In most operating system embodiments, application programs may be isolated from one another during execution such that one application may only detect the effects of another, such as a write to a given file, after the fact. However, at the point a file operation (e.g., a modification or copy operation) is visible to another application, the operation may have already occurred and information regarding the source of the operation may no longer be available.

SUMMARY OF THE INVENTION

Various embodiments of a system and method for detecting and storing file content access information within a file system are disclosed. In one embodiment, the system may include a storage device configured to store a plurality of files and a file system configured to manage access to the storage device. The file system may be configured to detect an operation to access content of a first file stored on the storage device and, subsequent to detecting the operation, store a record of the operation associated with the first file, where the record includes a signature corresponding to the first file.

In one specific implementation of the system, the operation may correspond to a file read operation, or a file write operation. In another specific implementation of the system, the operation may be generated by an application and the record may include an identity of the application. In yet another specific implementation of the system, the record may be stored in a named stream corresponding to the first file, the file system may include a history stream, and wherein the file system may be further configured to store an indication of the operation in the history stream in response to storing the record in the named stream.

A method is also contemplated which, in one embodiment, may include storing a plurality of files, detecting an operation to access content of a first stored file, and subsequent to detecting the operation, storing a record of the operation associated with satheid first stored file, wherein the record includes a signature corresponding to the first stored file.

Figure 1:
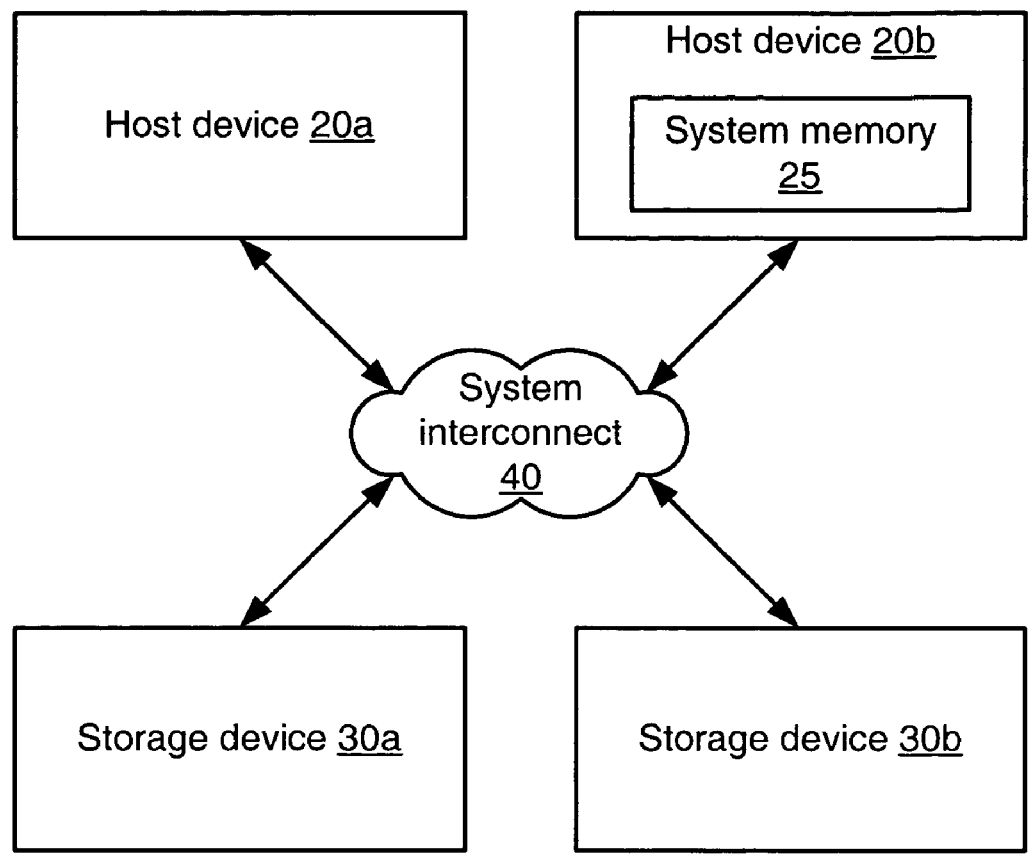
FIG. 1 is a block diagram illustrating one embodiment of a storage system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Storage System and File System Overview

Turning now to FIG. 1, a block diagram of one embodiment of a storage system is shown. In the illustrated embodiment, storage system 10 includes a plurality of host devices 20a and 20b coupled to a plurality of storage devices 30a and 30b via a system interconnect 40. Further, host device 20b includes a system memory 25 in the illustrated embodiment. For simplicity of reference, elements referred to herein by a reference number followed by a letter may be referred to collectively by the reference number alone. For example, host devices 20a and 20b and storage devices 30a and 30b may be referred to collectively as host devices 20 and storage devices 30.

In various embodiments of storage system 10, host devices 20 may be configured to access data stored on one or more of storage devices 30. In one embodiment, storage system 10 may be implemented within a single computer system, for example as an integrated storage server. In such an embodiment, for example, host devices 20 may be individual processors, system memory 25 may be a cache memory such as a static RAM (SRAM), storage devices 30 may be mass storage devices such as hard disk drives or other writable or rewritable media, and system interconnect 40 may include a peripheral bus interconnect such as a Peripheral Component Interface (PCI) bus. In some such embodiments, system interconnect 40 may include several types of interconnect between host devices 20 and storage devices 30. For example, system interconnect 40 may include one or more processor buses (not shown) configured for coupling to host devices 20, one or more bus bridges (not shown) configured to couple the processor buses to one or more peripheral buses, and one or more storage device interfaces (not shown) configured to couple the peripheral buses to storage devices 30. Storage device interface types may in various embodiments include the Small Computer System Interface (SCSI), AT Attachment Packet Interface (ATAPI), Firewire, and/or Universal Serial Bus (USB), for example, although numerous alternative embodiments including other interface types are possible and contemplated.

In an embodiment of storage system 10 implemented within a single computer system, storage system 10 may be configured to provide most of the data storage requirements for one or more other computer systems (not shown), and may be configured to communicate with such other computer systems. In an alternative embodiment, storage system 10 may be configured as a distributed storage system, such as a storage area network (SAN), for example. In such an embodiment, for example, host devices 20 may be individual computer systems such as server systems, system memory 25 may be comprised of one or more types of dynamic RAM (DRAM), storage devices 30 may be standalone storage nodes each including one or more hard disk drives or other types of storage, and system interconnect 40 may be a communication network such as Ethernet or Fibre Channel. A distributed storage configuration of storage system 10 may facilitate scaling of storage system capacity as well as data bandwidth between host and storage devices.

In still another embodiment, storage system 10 may be configured as a hybrid storage system, where some storage devices 30 are integrated within the same computer system as some host devices 20, while other storage devices 30 are configured as standalone devices coupled across a network to other host devices 20. In such a hybrid storage system, system interconnect 40 may encompass a variety of interconnect mechanisms, such as the peripheral bus and network interconnect described above.

It is noted that although two host devices 20 and two storage devices 30 are illustrated in FIG. 1, it is contemplated that storage system 10 may have an arbitrary number of each of these types of devices in alternative embodiments. Also, in some embodiments of storage system 10, more than one instance of system memory 25 may be employed, for example in other host devices 20 or storage devices 30. Further, in some embodiments, a given system memory 25 may reside externally to host devices 20 and storage devices 30 and may be coupled directly to a given host device 20 or storage device 30 or indirectly through system interconnect 40.

In many embodiments of storage system 10, one or more host devices 20 may be configured to execute program instructions and to reference data, thereby performing a computational function. In some embodiments, system memory 25 may be one embodiment of a computer-accessible medium configured to store such program instructions and data. However, in other embodiments, program instructions and/or data may be received, sent or stored upon different types of computer-accessible media. Generally speaking, a computer-accessible medium may include storage media or memory media such as magnetic or optical media, e.g., disk or CD-ROM included in storage system 10 as storage devices 30. A computer-accessible medium may also include volatile or non-volatile media such as RAM (e.g. SDRAM, DDR SDRAM, RDRAM, SRAM, etc.), ROM, etc, that may be included in some embodiments of storage system 10 as system memory 25. Further, a computer-accessible medium may include transmission media or signals such as electrical, electromagnetic, or digital signals, conveyed via a communication medium such as network and/or a wireless link, which may be included in some embodiments of storage system 10 as system interconnect 40.

In some embodiments, program instructions and data stored within a computer-accessible medium as described above may implement an operating system that may in turn provide an environment for execution of various application programs. For example, a given host device 20 may be configured to execute a version of the Microsoft Windows operating system, the Unix operating system, the Apple Macintosh operating system, or another suitable operating system. Additionally, a given host device may be configured to execute application programs such as word processors, web browsers and/or servers, email clients and/or servers, and multimedia applications, among many other possible applications.

During execution on a given host device 20, either the operating system or a given application may generate requests for data to be loaded from or stored to a given storage device 30. For example, code corresponding to portions of the operating system or an application itself may be stored on a given storage device 30, so in response to invocation of the desired operation system routine or application program, the corresponding code may be retrieved for execution. Similarly, operating system or application execution may produce data to be stored.

Many operating system embodiments provide data and control structures for organizing the storage space provided by storage devices 30 into files. In various embodiments, the data structures may include one or more tables configured to store information such as, for example, the identity of each file, its location within storage devices 30 (e.g., a mapping to a particular physical location within a particular storage device), as well as other information about each file as described in greater detail below. Also, in various embodiments, the control structures may include executable routines for manipulating files, such as, for example, function calls for changing file identity and for modifying file content as described in greater detail below. Collectively, these data and control structures may be referred to herein as a file system, and the particular data formats and protocols implemented by a given file system may be referred to herein as the format of the file system.

In some embodiments, a file system may be integrated into the operating system such that any access to data stored on storage devices 30 is governed by the control and data structures of the file system. Different operating systems may implement different native file systems using different formats, but in some embodiments, a given operating system may include a file system that supports multiple different types of file system formats, including file system formats native to other operating systems. In such embodiments, the various file system formats supported by the file system may be referred to herein as local file systems. Additionally, in some embodiments, a file system may be implemented using multiple layers of functionality arranged in a hierarchy, as illustrated in FIG. 2.

Figure 2:
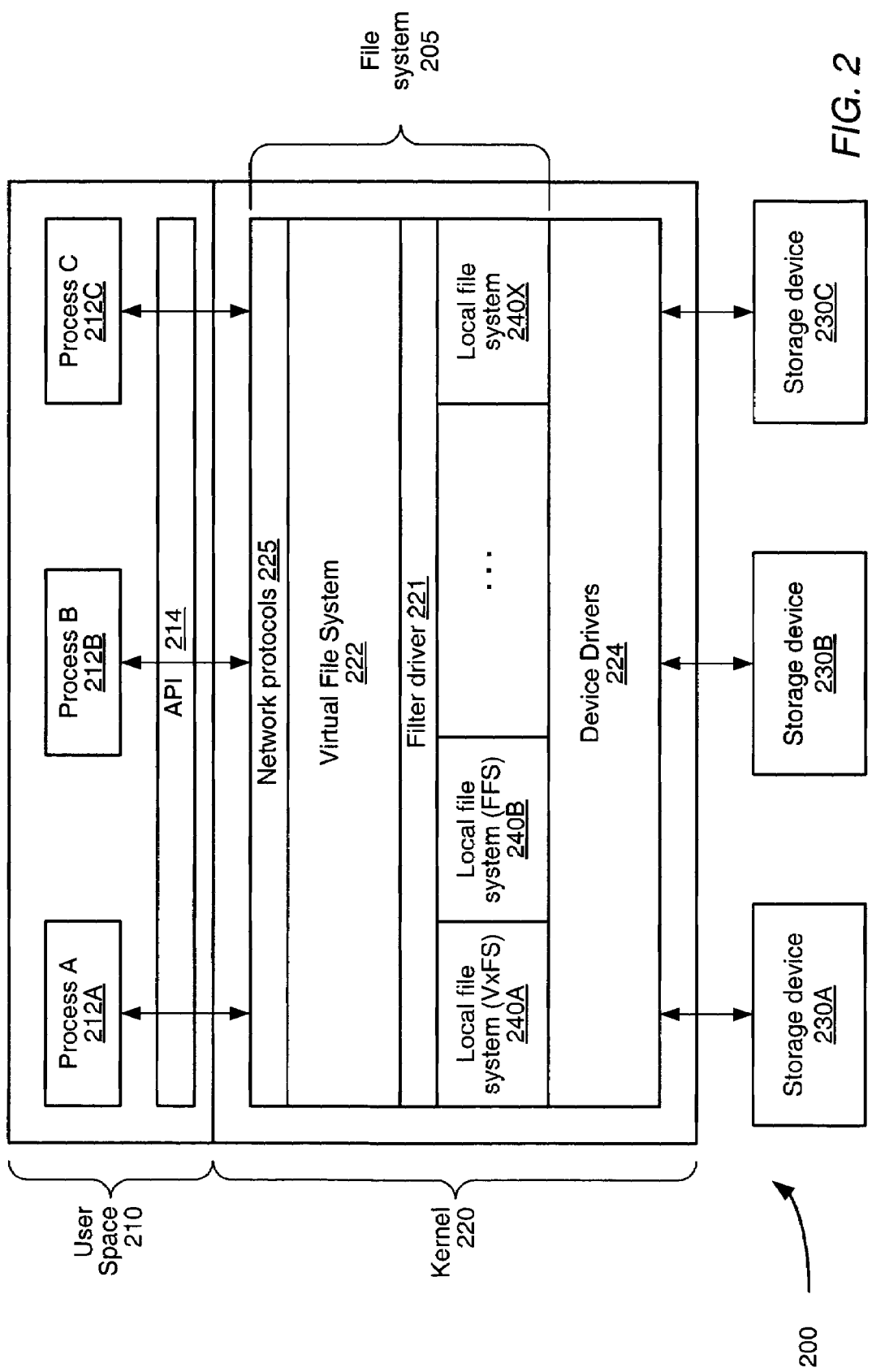
FIG. 2 is a block diagram illustrating one embodiment of an operating system architecture and its interface to storage devices.

FIG. 2 illustrates one embodiment of an operating system architecture and its interface to storage devices. In the illustrated embodiment, operating system 200 includes a user space 210 and a kernel space 220. User space 210 includes a plurality of processes 212A–C, each of which may correspond to a given user application. In some embodiments, some application processes 212 within user space 210 may be distinct from operating system 200. Such processes may be said to operate within an environment provided by operating system 200, or to operate "on top of" operating system 200. Each of processes 212 may be configured to access storage devices 230A–C through calls to application programming interface (API) 214. API 214 provides processes 212 with access to file system 205, which is configured to operate within kernel space 220. In one embodiment, storage devices 230 may be illustrative of storage devices 30 of FIG. 1. Also, in one embodiment, operating system 200, any of its components, and/or any of processes 212 may be configured to execute on one or more host devices 20 of FIG. 1, for example as program instructions and data stored within a computer-accessible medium such as system memory 25 of FIG. 1.

As described above with respect to storage system 10 of FIG. 1, a given host device 20 may reside in a different computer system from a given storage device 30, and may access that storage device via a network. Likewise, with respect to operating system 200, in one embodiment a given process such as process 212A may execute remotely and may access storage devices 230 over a network. In the illustrated embodiment, file system 200 includes network protocols 225 to support access to the file system by remote processes. In some embodiments, network protocols 225 may include support for the Network File System (NFS) protocol or the Common Internet File System (CIFS) protocol, for example, although it is contemplated that any suitable network protocol may be employed, and that multiple such protocols may be supported in some embodiments.

File system 205 may be configured to support a plurality of local file systems. In the illustrated embodiment, file system 205 includes a VERITAS (VxFS) format local file system 240A, a fast file system (FFS) format local file system 240B, and a proprietary (X) format local file system 240X. However, it is contemplated that in other embodiments, any number or combination of local file system formats may be supported by file system 205. To provide a common interface to the various local file systems 240, file system 205 includes a virtual file system 222. In one embodiment, virtual file system 222 may be configured to translate file system operations originating from processes 212 to a format applicable to the particular local file system 240 targeted by each operation. Additionally, in the illustrated embodiment operating system 200 includes device drivers 224 through which local file systems 240 may access storage devices 230. Device drivers 224 may implement data transfer protocols specific to the types of interfaces employed by storage devices 230. For example, in one embodiment device drivers 224 may provide support for transferring data across SCSI and ATAPI interfaces, though in other embodiments device drivers 224 may support other types and combinations of interfaces.

In the illustrated embodiment, file system 205 also includes filter driver 221. In some embodiments, filter driver 221 may be configured to monitor each operation entering file system 205 and, subsequent to detecting particular types of operations, to cause additional operations to be performed or to alter the behavior of the detected operation. For example, in one embodiment filter driver 221 may be configured to combine multiple write operations into a single write operation to improve file system performance. In another embodiment, filter driver 221 may be configured to compute a signature of a file subsequent to detecting a write to that file. In still another embodiment, filter driver 221 may be configured to store information, such as records, associated with particular files subsequent to detecting certain kinds of operations on those files, as described in greater detail below. It is contemplated that in some embodiments, filter driver 221 may be configured to implement one or more combinations of the aforementioned operations, including other filter operations not specifically mentioned.

It is noted that filter driver 221 is part of file system 205 and not an application or process within user space 210. Consequently, filter driver 221 may be configured to operate independent of applications and processes within the user space 210. Alternatively, or in addition to the above, filter driver 221 may be configured to perform operations in response to requests received from applications or processes within the user space 210.

It is further noted that in some embodiments, kernel space 220 may include processes (not shown) that generate accesses to storage devices 230, similar to user space processes 212. In such embodiments, processes executing in kernel space 220 may be configured to access file system 205 through a kernel-mode API (not shown), in a manner similar to user space processes 212. Thus, in some embodiments, all accesses to storage devices 230 may be processed by file system 205, regardless of the type or space of the process originating the access operation.

Numerous alternative embodiments of operating system 200 and file system 205 are possible and contemplated. For example, file system 205 may support different numbers and formats of local file systems 240, or only a single local file system 240. In some embodiments, network protocol 225 may be omitted or integrated into a portion of operating system 200 external to file system 205. Likewise, in some embodiments virtual file system 222 may be omitted or disabled, for example if only a single local file system 240 is in use. Additionally, in some embodiments filter driver 221 may be implemented within a different layer of file system 205. For example, in one embodiment, filter driver 221 may be integrated into virtual file system 222, while in another embodiment, an instance of filter driver 221 may be implemented in each of local file systems 240.

Tracking File Identity Change Operations

As described above, file system 205 may be configured to manage access to a plurality of files stored on storage devices 230. In many embodiments, each stored file may have an associated identity used by the file system to distinguish each file from other files. In one embodiment of file system 205, the identity of a file may be a file name, which may for example include a string of characters such as "filename.txt". In embodiments of file system 205 that implement a file hierarchy, such as a hierarchy of folders or directories, all or part of the file hierarchy may be included in the file identity.

In the course of execution, operating system 200 and/or processes 212 may generate operations configured to modify the identity of one or more files managed by file system 205. In one embodiment, such identity-modifying operations may include any of the following: a file create operation, a file delete operation, a file rename operation, or a file copy operation. For example, a given process such as process 212A may receive a directive from a user to save work in a file with a corresponding identity that does not currently exist within file system 205, or to delete a specified file. Process 212A may then respectively generate a file create operation to create a file with the specified file identity, or a file delete operation to delete the specified file. Similarly, process 212A may receive a directive from a user to rename or copy a given file to a file with a specified identity. Process 212A may then respectively generate a file rename operation or a file copy operation. In some embodiments, certain identity-modifying operations may be implemented using other identity-modifying operations. For example, a file rename operation may be implemented as a file create operation (specifying the identity of the target file of the rename) followed by a file delete operation (specifying the identity of the source file of the rename).

Figure 3:
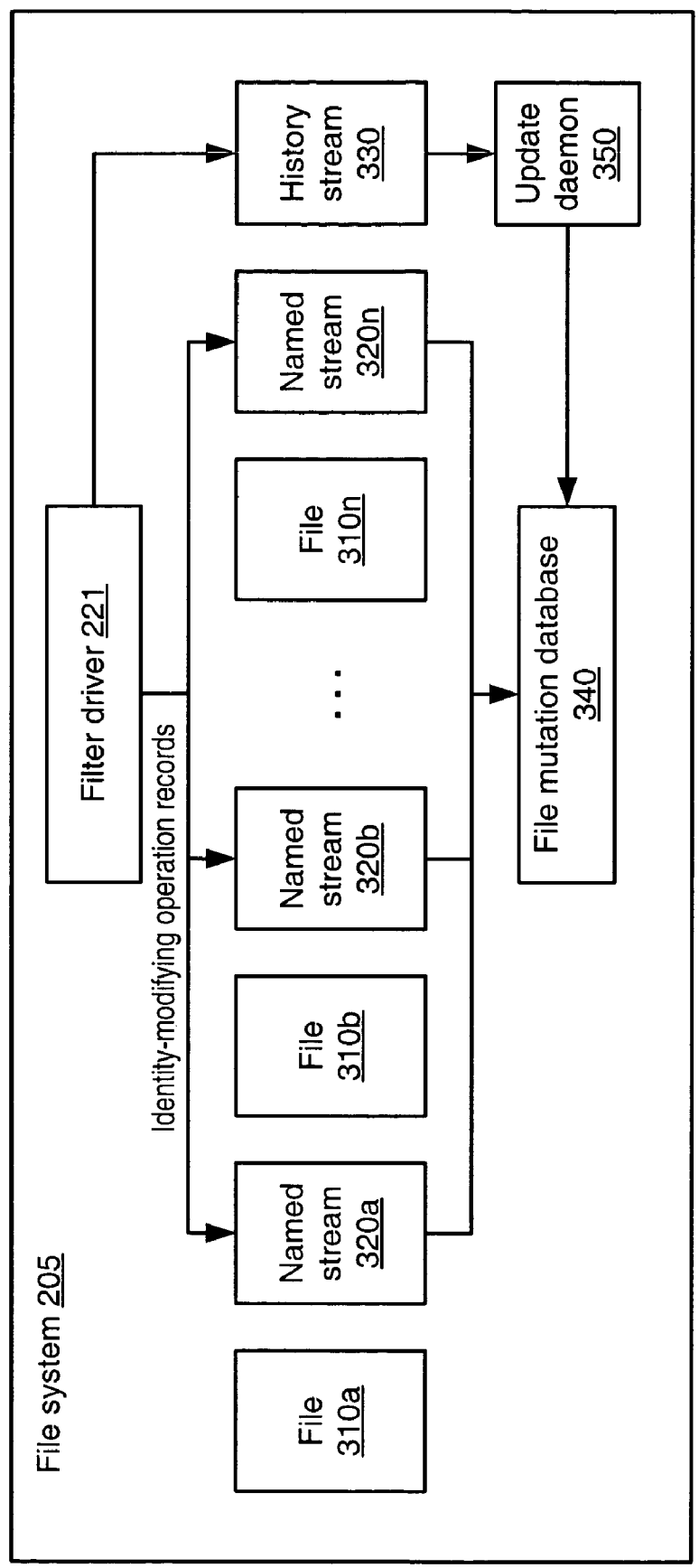
FIG. 3 is a block diagram illustrating one embodiment of a file system configured to detect identity-modifying operations on files.

In one embodiment, file system 205 may be configured to detect various kinds of identity-modifying operations on files, and to store records of such operations. FIG. 3 illustrates one such embodiment of a file system. The embodiment of file system 205 shown in FIG. 3 may include those elements illustrated in the embodiment of FIG. 2; however, for sake of clarity, some of these elements are not shown. In the illustrated embodiment, file system 205 includes filter driver 221, an arbitrary number of files 310a–n, and a respective named stream 320a–n associated with each of files 310a–n. File system 205 further includes a history stream 330, a file mutation database 340, and an update daemon 350. It is noted that a generic instance of one of files 310a–n or named streams 320a–n may be referred to respectively as a file 310 or a named stream 320, and that files 310a–n and named streams 320a–n may be referred to collectively as files 310 and named streams 320, respectively.

Files 310 may be representative of files managed by file system 205. Each of files 310 has a corresponding named stream 320. Each of named streams 320 may be configured to store information about its corresponding file, which may be referred to herein as metadata. In various embodiments, metadata may include information such as (but not limited to) the file identity, size, ownership, and file access permissions, as well as records corresponding to detected identity-modifying operations, as described below. It is noted that files 310 and named streams 320 may be physically stored on one or more storage devices, such as storage devices 230 of FIG. 2. However, for purposes of illustration, files 310 and named streams 320 are shown as conceptually residing within file system 205.

Identity-modifying Operation Record Generation and Format

In one particular embodiment, file system 205 may be configured to detect an operation to modify the identity of a file 310, such as one of the identity-modifying operations described above. In such an embodiment, filter driver 221 may be configured to detect the identity-modifying operation when it is received by file system 205, or at some later time. Subsequent to detecting the identity-modifying operation, filter driver 221 may be configured to store a record of the detected operation in a named stream 320 corresponding to the target file of the operation. For example, if file 310a is the target of the detected operation, filter driver 221 may store a record of the operation in corresponding named stream 320a. It is contemplated that storage of a record may take place at any time subsequent to detection of the relevant operation. For example, in one embodiment, storage of the record may be delayed until the operation on file 310a is complete, while in another embodiment, storage of the record may occur prior to completion of the operation. In the latter case, if the operation is not guaranteed to complete (i.e., is speculative), filter driver 221 may provide a mechanism to delete a record stored in advance of its corresponding operation in case the operation does not complete.

The record stored by filter driver 221 subsequent to detecting an identity-modifying operation may in various embodiments include various kinds of information about the file 310 and the identity-modifying operation detected, such as the file identity, file type, file size, file owner, and/or file permissions, for example. In one embodiment, the record may include a file signature indicative of the content of file 310. A file signature may be a hash-type function of all or a portion of the file contents and may have the property that minor differences in file content yield quantifiably distinct file signatures. For example, the file signature may employ the Message Digest 5 (MD5) algorithm, which may yield different signatures for files differing in content by as little as a single bit, although it is contemplated that any suitable signature-generating algorithm may be employed. In some embodiments, filter driver 221 may compute the file signature at the time the record of the identity-modifying operation is detected or stored, while in other embodiments filter driver 221 may use a file signature that was computed prior to detection of the operation.

In one embodiment, the record stored by filter driver 221 subsequent to detecting an identity-modifying operation may be generated and stored in Extensible Markup Language (XML) format, although it is contemplated that in other embodiments, any suitable format may be used. One example of an XML-format record is as follows:

```
<record sequence="1">
    <path>/test1/foo.pdf</path>
    <type>application/pdf</type>
    <user id=1598>username</user>
    <group id=119>groupname</group>
    <perm>rw-r--r--</perm>
    <md5>d41d8cd98f00b204e9800998ecf8427e</md5>
    <size>0</size>
</record>
```

Such a record may be appended to the named stream (for example, named stream 320*a*) associated with the file (for example, file 310*a*) having the file identity "/test1/foo.pdf" subsequent to a file create operation. In this case, the number associated with the "record sequence" field indicates that this record is the first record associated with file 310*a*. The "path" field includes the file identity, and the "type" field indicates the file type, which in one embodiment may be provided by the process issuing the file create operation, and in other embodiments may be determined from the extension of the file name or from header information within the file, for example. The "user id" field records both the numerical user id and the textual user name of the user associated with the process issuing the file create operation, and the "group id" field records both the numerical group id and the textual group name of that user. The "perm" field records file permissions associated with file 310*a* in a format specific to the file system 205 and/or the operating system. The "md5" field records an MD5 signature corresponding to the file contents, and the "size" field records the length of file 310*a* in bytes. It is contemplated that in alternative embodiments, filter driver 221 may store records corresponding to identity-modifying operations that include more or fewer fields, as well as fields having different definitions and content.

Filter driver 221 may be configured to append a record similar to the one illustrated above to the named stream 320 corresponding to a file 310 subsequent to detecting an identity-modifying operation of that file such as a create, delete, rename, or copy operation. Additionally, filter driver 221 may be configured to append a similar record to a named stream 320 corresponding to a file 310 when a process modifies the contents of file 310 without issuing an identity-modifying operation to the file. For example, in one embodiment filter driver 221 may be configured to detect a file close operation to a file 310 whose contents have been modified, where the file close operation is issued by the last process having the modified file open. In other words, multiple processes may have issued file open operations to a file 310 that is subsequently modified, and filter driver 221 may be configured to detect the last of such processes to issue a file close operation. Subsequent to detecting such a "last close" of the modified file 310, filter driver 221 may be configured to update the signature associated with the file 310 and to append a record including the updated signature to the named stream 320 corresponding to file 310. Filter driver 221 may thereby ensure that signatures reflected in records in named streams of files remain current without tracking each individual write of such files. Referring to the above example record, filter driver 221 may write the following example record to the named stream 320*a* of file 310*a* "/test1/foo.pdf" upon detecting the last close of the file following modification:

```
<record sequence="2">
    <path>/test1/foo.pdf</path>
    <type>application/pdf</type>
    <user id=1598>username</user>
    <group id=119>groupname</group>
    <perm>rw-r--r--</perm>
    <md5>b42455dadf928643d8df3171cca9216a</md5>
    <size>10597</size>
</record>
```

As illustrated in this example record, the "md5" and "size" fields have been updated to reflect the modification to file 310*a*.

Certain identity-modifying file operations may involve more than one of files 310. For example, file rename and file copy operations may involve one or more source files and a destination file, where the destination file may or may not exist at the time the operation is performed. Subsequent to detecting identity-modifying operations involving more than one file, filter driver 221 may be configured to mark the existing records (if any) in the named stream 320 corresponding to the destination file 310 as "old," and to append each record in the named streams corresponding to each source file to the named stream corresponding to the destination file. For example, subsequent to the modification of file 310*a* "/test1/foo.pdf" shown above, filter driver 221 may detect a file rename operation to rename file 310*a* "/test1/foo.pdf" to file 310*b* "/test1/destination.pdf", which latter file may already exist and may have a number of records in its associated named stream 320*b*. Subsequently, filter driver 221 may mark the existing records associated with file 310*b* "/test1/destination.pdf" as old and associate each of the records associated with file 310*a* "/test1/foo.pdf" in its named stream 320*a* to the named stream 320*b* of file 310*b* "/test1/destination.pdf", along with a new record indicating the identity change. Following this activity, the content of the named stream 320*b* of file 310*b* "/test1/destination.pdf" may include the following records:

```
<record sequence="1">
    <path>/test1/foo.pdf</path>
    ...
</record>
<record sequence="2">
    <path>/test1/foo.pdf</path>
    ...
</record>
<record sequence="3">
    <path>/test1/destination.pdf</path>
    <type>application/pdf</type>
    <user id=1598>username</user>
    <group id=119>groupname</group>
    <perm>rw-r--r--</perm>
    <md5>b42455dadf928643d8df3171cca9216a</md5>
    <size>10597</size>
    <oldrecord>
        <record sequence="1">
            <path>/test1/destination.pdf</path>
            ...
        </record>
        ...
    </oldrecord>
</record>
``` where the first two records listed (with content omitted for clarity) may be identical to the first two records of file 310*a* "/test1/foo.pdf" as shown above, and the third record indicates the change in file identity to "/test1/destination.pdf". The other fields of the third record may be copied or linked from the most recent record of file 310*a* "/test1/foo.pdf" as indicated above. Further, records corresponding to file 310*b* "/test1/destination.pdf" prior to the identity change are shown being preserved (though their specific content is omitted for clarity) and delimited with the <oldrecord> indicator. As shown above, the preserved old records are associated with a particular record (in this case, the third record), although in other embodiments it is contemplated that the old records may be associated with a different record or may constitute a standalone record separate from and not within the scope of another record.

It is noted that in some embodiments, following the aforementioned processing of records, filter driver 221 may be configured to delete the records associated with the source file 310 if the identity change operation is a file rename operation and to preserve the records associated with the source file 310 if the identity-modifying operation is a file copy operation. It is further noted that in some embodiments, file rename or copy operations may result in associated metadata records being duplicated in multiple named streams, whereas in other embodiments, metadata records may be associated with additional files by linking a pointer to an existing record into a named stream of a destination file rather than copying the record to the named stream of the destination file.

History Stream and File Mutation Database

In the illustrated embodiment, file system 205 includes history stream 330. History stream 330 may be a named stream similar to named streams 320; however, rather than being associated with a particular file, history stream 330 may be associated directly with file system 205. In some embodiments, file system 205 may include only one history stream 330, while in other embodiments, more than one history stream 330 may be provided. For example, in one embodiment of file system 205 including a plurality of local file systems 240 as illustrated in FIG. 2, one history stream per local file system 240 may be provided.

In some embodiments, filter driver 221 may be configured to store a record in history stream 330 in response to storing a record corresponding to an identity-modifying operation in a given named stream 320. For example, in response to storing a record subsequent to detecting an operation to modify the identity or the content of a file 310 as described above, filter driver 221 may store a record indicative of the operation in history stream 330 as well as the identity of the file operated on. History stream 330 may thereby provide a centralized history of the identity-modifying operations transpiring within file system 205.

In one embodiment, the record stored by filter driver 221 in history stream 330 may be generated in Extensible Markup Language (XML) format, although it is contemplated that in other embodiments, any suitable format may be used. Referring to the example above in which file 310*a* "/test1/foo.pdf" was created, modified, and then renamed to file 310*b* "/test1/destination.pdf", in one embodiment history stream 330 may include the following example records subsequent to the rename operation:

```
<record>
    <op>create</op>
    <path>/test1/foo.pdf</path>
</record>
<record>
    <op>modify</op>
    <path>/test1/foo.pdf</path>
</record>
<record>
    <op>rename</op>
    <path>/test1/destination.pdf</path>
    <oldpath>/test1/foo.pdf</oldpath>
</record>
```

In this example, the "op" field of each record indicates the operation performed, while the "path" field indicates the file identity of the file 310*a* operated on. In the case of the file rename operation, the "path" field indicates the file identity of the destination file 310*b* of the rename operation, and the "oldpath" field indicates the file identity of the source file 310*a*. It is contemplated that in alternative embodiments, filter driver 221 may store within history stream 330 records including more or fewer fields, as well as fields having different definitions and content.

Update daemon 350 may be configured as either a kernel-mode or a user-mode process operating within file system 205, although it is contemplated that in some embodiments, update daemon 350 may be implemented external to file system 205. In the illustrated embodiment, update daemon 350 may scan the records stored in history stream 330 at regular or irregular intervals. If a valid record is found, for each destination file 310 recorded in the history stream (i.e., the file identified by the "path" field in the above example), update daemon 350 may be configured to access the corresponding named stream 320, and to convey the records stored therein to file mutation database 340. (In case a record stored in history stream 330 indicates that a given file 310 has been deleted, update daemon 350 may in one embodiment convey only that indication to file mutation database 340, as the named stream 320 corresponding to the deleted file 310 may have also been deleted.) In one embodiment, update daemon 350 may convey all records stored in the corresponding named stream 320, while in other embodiments, update daemon 350 may convey only those records not previously conveyed to file mutation database 340. For example, in one embodiment each record in each named stream 320 may include a "scanned" field that may be tested and set by update daemon 350, such that only unscanned records are conveyed to file mutation database 340. Similarly, in various embodiments update daemon 350 may mark records in history stream 330 as they are scanned, processing only unmarked records, or may delete them from history stream 330 after scanning.

It is noted that in an alternative embodiment, history stream 330 may be omitted from file system 205. In such an embodiment, update daemon 350 may be configured to scan all named streams 320 within file system 205 at regular or irregular intervals, conveying all or only modified records to file mutation database 340. Further, in another alternative embodiment, both history stream 330 and update daemon 350 may be omitted from file system 205. In such an embodiment, filter driver 221 may signal file mutation database 340 directly upon generating a record, such as via a software interrupt or function call, for example. Filter driver 221 may be configured to directly convey records to file mutation database 340, in which case records may not be stored within named streams 320. Alternatively, file mutation database 340 may be configured to retrieve records directly from named streams 320 in response to receiving notification from filter driver 221 to do so.

In the illustrated embodiment, file mutation database (FMD) 340 is a database integrated with file system 205, although it is contemplated that in other embodiments, FMD 340 may be implemented externally to file system 205. In various embodiments, FMD 340 may be configured as a kernel-mode or a user-mode process. FMD 340 may be configured to store records in the same format as the records stored in named streams 320 and history stream 330, such as XML format records. However, it is contemplated that file mutation database 340 may implement any suitable database format or architecture. Further, in some embodiments, FMD 340 or update daemon 350 may be configured to convert records stored in one format within named streams 320 and history stream 330 to another format for storage within FMD 340. File system 205 may provide an API through which various processes may submit database queries to FMD 340, which may in turn be configured to respond to such queries.

Numerous types of queries of FMD 340 are possible and contemplated, dependent on the type of information included in the records of identity-modifying operations generated by filter driver 221. For example, in one embodiment, whenever update daemon 350 conveys a record from a named stream 320 to FMD 340, FMD 340 may build a list identifying all files 310 having file signatures identical to the one included in the conveyed record. Subsequently, FMD 340 may be queried to identify all files sharing the file signature corresponding to a given file identity.

Other types of queries may include queries to determine file lineage relationships among two or more files. Generally speaking, file lineage relationships refer to the relationships created among files as a result of identity-modifying operations. Queries to determine file lineage relationships may include lineage pool queries and file ancestor queries, although other lineage relationships and associated queries are possible and contemplated. Files 310 may be considered to be members of the same lineage pool if they share a common file signature at some point in time, i.e., if each file has a record indicating the same file signature. A given file 310a may be considered to be an ancestor of a given file 310b if the first valid file signature of file 310b (i.e., the earliest record of file 310b including a file signature) matches some file signature of file 310a. Using such records and queries, file system 205 may be configured to detect and track the identities of files as those identities evolve through the execution of identity-modifying file operations. Such tracking may be useful, for example, in tracking the origins of properly or improperly modified files, or in implementing effective storage policies such as allowing files with identical content but different identities to share storage.

Other embodiments of file system 205 may be configured to determine file lineage relationships. For example, in one embodiment, FMD 340 may be omitted, and a query process may be configured to operate directly on records stored within named streams 320 to determine file lineage relationships. In another embodiment, named streams 320 may be omitted and records may be stored at the time of generation directly within FMD 340 or another type of repository for subsequent determination of file lineage relationships.

Figures 4A, 4B:
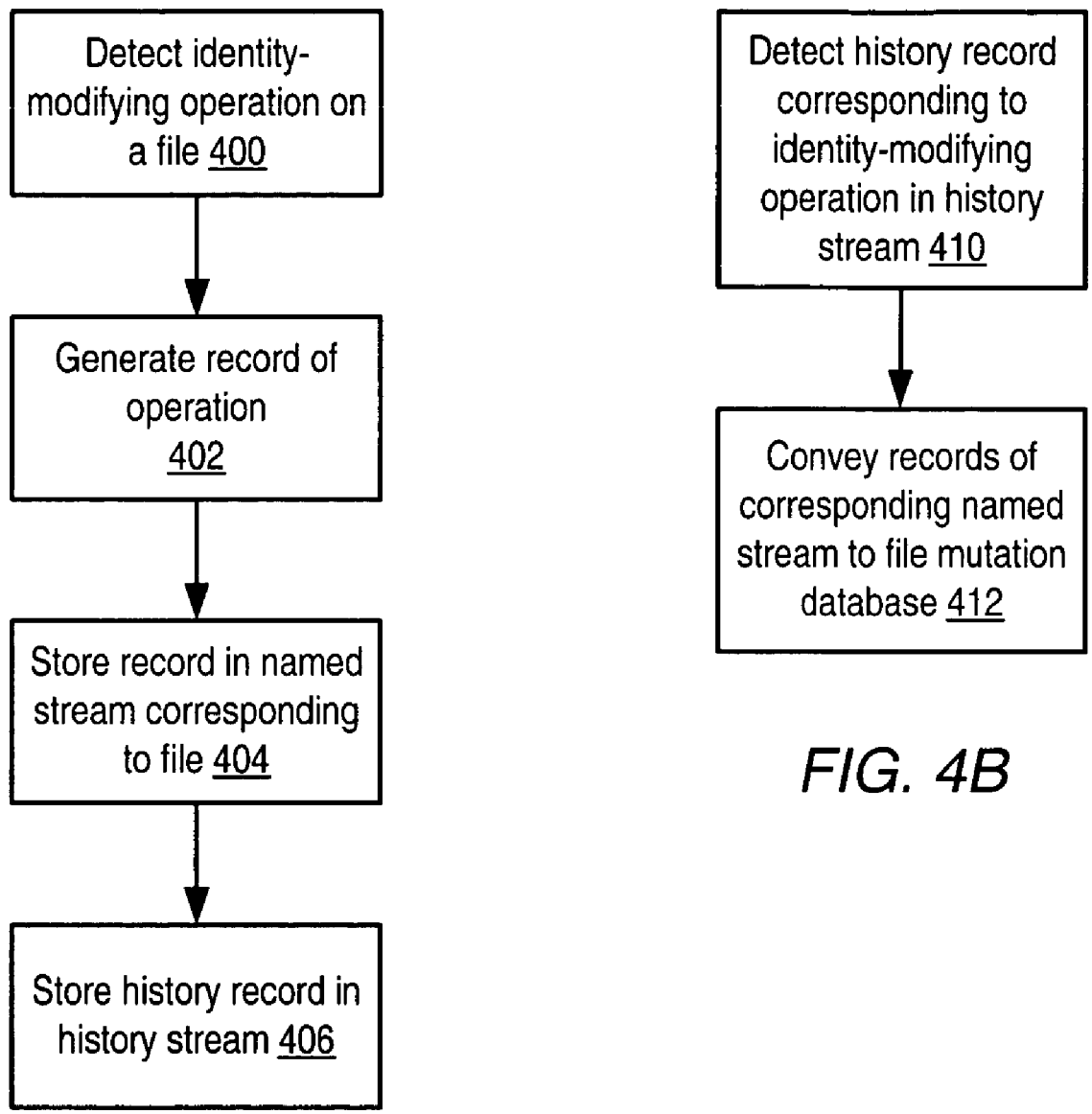
FIG. 4A is a flow diagram illustrating one embodiment of a method of generating and storing records corresponding to identity-modifying file operations.
FIG. 4B is a flow diagram illustrating one embodiment of a method of importing records corresponding to identity-modifying file operations into a file mutation database.

FIG. 4A and FIG. 4B illustrate embodiments of methods of generating and storing records corresponding to identity-modifying file operations and of importing such records into a file mutation database, respectively. Referring collectively to FIG. 1 through FIG. 3 and FIG. 4A, operation begins in block 400 where an operation to modify the identity of a file is detected. In one embodiment, filter driver 221 of file system 205 may be configured to detect an identity-modifying operation as described above.

Subsequent to detection of the identity-modifying operation, a record of the operation is generated (block 402). In some embodiments, filter driver 221 may be configured to generate this record, and as described above, in some embodiments the record may be in the XML format and may include information about the operation, the file identity, a signature corresponding to the file, and other information as desired.

After the operation record is generated, it is stored in a named stream corresponding to the file (block 404). Additionally, a history record of the operation is stored in a history stream (block 406). As noted above, filter driver 221 may be configured in some embodiments to store the generated record in a named stream 320 corresponding to the file 310 targeted by the operation, and may additionally be configured to store a history record such as described above in history stream 330.

The method of FIG. 4B may in some embodiments operate in parallel to the method illustrated in FIG. 4A. For example, the method of FIG. 4B may be implemented within update daemon 350. Referring collectively to FIG. 1 through FIG. 3 and FIG. 4B, operation begins in block 410 where a history record corresponding to an identity-modifying operation is detected within the history stream. As described above, in one embodiment update daemon 350 may be configured to scan history stream 330 to detect history records not previously processed.

Once a history record is detected, the records stored in the named stream of the file indicated in the history record are accessed and conveyed to the file mutation database (block 412). As described above, in one embodiment update daemon 350 may be configured to access the named stream corresponding to a file indicated in the history record and convey the records included therein to file mutation database 340.

Other embodiments of these methods are possible and contemplated. For example, as noted above, in some embodiments of file system 205, history stream 330 may be omitted, and update daemon 350 may be configured to scan the entire file system to determine the presence of updated records. Also, in some embodiments update daemon 350 may be omitted and filter driver 221 may communicate directly with file mutation database 340.

Figures 4C, 4D:
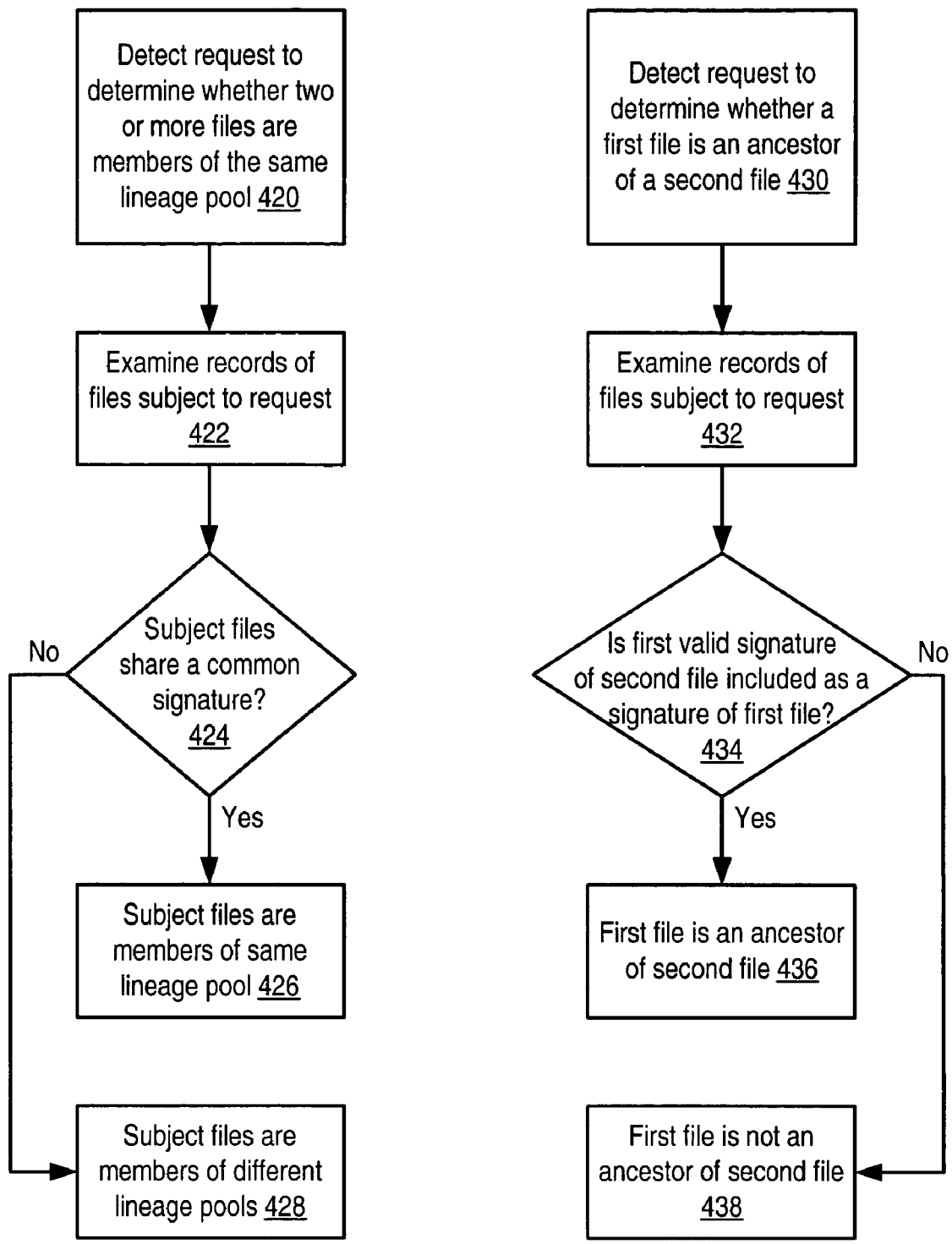
FIG. 4C is a flow diagram illustrating one embodiment of a method of determining whether two files are in the same lineage pool.
FIG. 4D is a flow diagram illustrating one embodiment of a method of determining whether one file is an ancestor of another file.

FIG. 4C illustrates an embodiment of a method of determining whether two files are in the same lineage pool. Referring collectively to FIG. 1 through FIG. 3 and FIG. 4C, operation begins in block 420 where a request to determine whether two or more files are members of the same lineage pool is detected. For example, in one embodiment FMD 340 may be configured to detect a query corresponding to such a request.

Upon detecting such a request, the records corresponding to each file subject to the request may be examined (block 422). For example, in one embodiment FMD 340 may be configured to identify the database records corresponding to each subject file. In another embodiment, the records stored in named streams 320 corresponding to the subject files 310 may be scanned.

Subsequent to examination of the appropriate records, it may be determined whether the subject files share a common signature in any of their collective records (block 424). For example, in one embodiment FMD 340 may be configured to compare each unique signature indicated in the records of each subject file with each signature indicated in the records of every other subject file and to note signature matches. If a common signature exists among all subject files, the subject files may be determined to be members of the same lineage pool (block 426). Otherwise, the subject files may be determined to be members of different lineage pools (block 428).

FIG. 4D illustrates an embodiment of a method of determining whether one file is an ancestor of another file. Referring collectively to FIG. 1 through FIG. 3 and FIG. 4D, operation begins in block 430 where a request to determine whether a first file is an ancestor of a second file is detected. For example, in one embodiment FMD 340 may be configured to detect a query corresponding to such a request.

Upon detecting such a request, the records corresponding to each file subject to the request may be examined (block 432). For example, in one embodiment FMD 340 may be configured to identify the database records corresponding to each subject file. In another embodiment, the records stored in named streams 320 corresponding to the subject files 310 may be scanned.

Subsequent to examination of the appropriate records, it may be determined whether the first valid signature of the second file is included as a signature of the first file (block 434). For example, in one embodiment FMD 340 may be configured to compare the first valid signature of the second file with each unique signature indicated in the records of the first file and to note signature matches. If a matching signature exists, the first file may be determined to be an ancestor of the second file (block 436). Otherwise, it may be determined that the first file is not an ancestor of the second file (block 438). It is contemplated that in an alternative embodiment, the method of FIG. 4D may also be configured to determine whether the second file is an ancestor of the first file, for example by modifying the step at block 436 to include comparing the first valid signature of the first file with each unique signature indicated in the records of the second file and noting signature matches.

Tracking Content Access Operations

Referring once again to FIG. 2, as described above, file system 205 may be configured to manage access to a plurality of files stored on storage devices 230. In addition to each file having an associated file identity as described above, each file may have corresponding content. In various embodiments, such content may include data such as text data, image data, sound data, or application-specific data such as Microsoft Word data, for example. In other embodiments, file content may include executable code. For example, the content of a given file may include instructions that, when executed, perform the various functions of a program or application. File content may be stored via file system 205 on storage devices 230 using any encoding suitable for storage devices 230. For example, file content may be stored on storage devices 230 using a binary encoding.

In the course of execution, operating system 200 and/or processes 212 may generate input/output (I/O) operations configured to access the content of one or more files managed by file system 205. In some embodiments, such I/O operations may include a file read operation or a file write operation, and in one embodiment a file write operation may be further categorized as either an appending write operation (i.e., a write operation that appends content to a file) or a random write operation (i.e., a write operation that may overwrite the content of a file). For example, a given process such as process 212A may receive a directive from a user to open an existing file to read its content, or to save work in an existing file. Process 212A may then respectively generate a file read operation to read the content of the specified file, or a file write operation (such as an appending write operation) to modify the content of the specified file. In some embodiments, certain I/O operations may invoke or be invoked by some of the identify-modifying operations described above. For example, if a given file identity does not exist, a file write operation to that file identity may result in a file create operation being performed, followed by a file write operation.

In some embodiments, file system 205 may be configured to aggregate file I/O operations on a per-process basis. For example, file system 205 may be configured to aggregate I/O operations on a given file performed by a particular process 212 from the time the file is opened until the time the file is closed by that particular process. This aggregation of I/O operations may be referred to herein as a content access operation. It is contemplated that the degree of aggregation of I/O operations into a single content access operation may vary in various embodiments. For example, in one embodiment all read and write I/O operations to a given file by a process 212 between the opening and closing of the given file may be aggregated into a single content access operation. In another embodiment, all such read I/O operations may be aggregated into one content access operation, and all such write I/O operations may be aggregated into a second content access operation. In yet another embodiment, each individual file I/O operation may correspond to a single content access operation.

Figure 5:
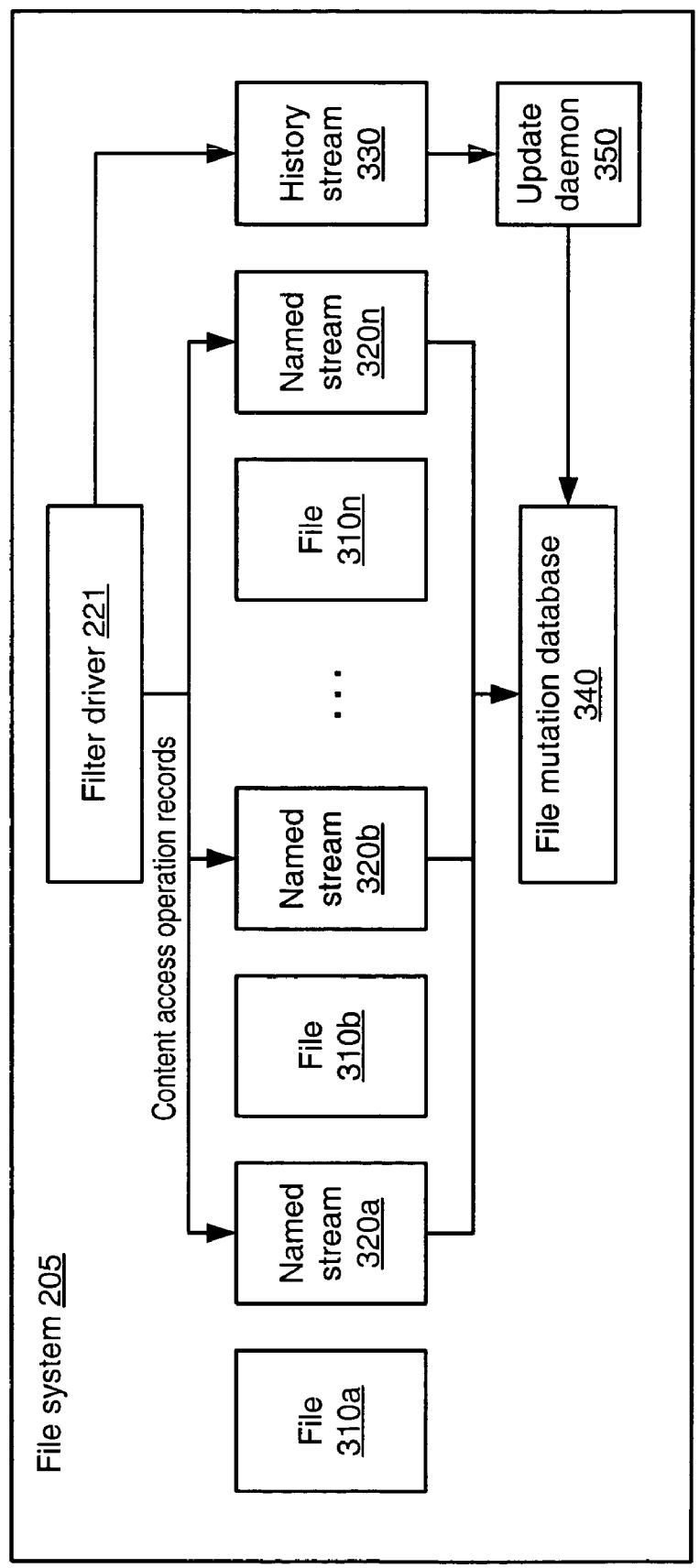
FIG. 5 is a block diagram illustrating one embodiment of a file system configured to detect content access operations on files.

In some embodiments, file system 205 may be configured to detect various kinds of content access operations on files, and to store records of such operations. FIG. 5 illustrates one such embodiment of a file system. The embodiment of file system 205 shown in FIG. 5 may include those elements illustrated in the embodiment of FIG. 2; however, for sake of clarity, some of these elements are not shown. Like the embodiment of FIG. 3, the embodiment of file system 205 illustrated in FIG. 5 includes filter driver 221, an arbitrary number of files 310*a–n*, and a respective named stream 320*a–n* associated with each of files 310*a–n*. File system 205 further includes a history stream 330, a file mutation database 340, and an update daemon 350. As above, a generic instance of one of files 310*a–n* or named streams 320*a–n* may be referred to respectively as a file 310 or a named stream 320, and that files 310*a–n* and named streams 320*a–n* may be referred to collectively as files 310 and named streams 320, respectively.

Files 310 may be representative of files managed by file system 205. Each of files 310 has a corresponding named stream 320. Each of named streams 320 may be configured to store metadata about its corresponding file, as described above in conjunction with the description of FIG. 3. As described in greater detail below, in various embodiments, metadata may include records corresponding to detected content access operations, as well as the other kinds of information mentioned previously. As with the embodiment of FIG. 3, it is noted that files 310 and named streams 320 may be physically stored on one or more storage devices, such as storage devices 230 of FIG. 2. However, for purposes of illustration, files 310 and named streams 320 are shown as conceptually residing within file system 205.

Content Access Operation Record Generation and Format

In one particular embodiment, file system 205 may be configured to detect an operation by a particular process 212 of FIG. 2 to access content of a file 310, such as one of the content access operations described above. In such an embodiment, filter driver 221 may be configured to detect the content access operation when it is received by file system 205, or at some later time. Subsequent to detecting the content access operation, filter driver 221 may be configured to store a record of the detected operation in a named stream 320 corresponding to the target file of the operation. For example, if file 310*a* is the target of the detected operation, filter driver 221 may store a record of the operation in corresponding named stream 320*a*. It is contemplated that storage of a record may take place at any time subsequent to detection of the relevant operation. For example, in one embodiment, storage of the record may be delayed until the operation on file 310*a* is complete, while in another embodiment, storage of the record may occur prior to completion of the operation. In the latter case, if the operation is not guaranteed to complete (i.e., is speculative), filter driver 221 may provide a mechanism to delete a record stored in advance of its corresponding operation in case the operation does not complete.

The record stored by filter driver 221 subsequent to detecting a content access operation may in various embodiments include various kinds of information about the file 310 and the content access operation detected, such as the file identity, file type, file size, file owner, file permissions, content access type, process identity, and/or process arguments, for example. In one embodiment, the record may include a file signature indicative of the content of file 310 as described in detail above, such as an MD5 signature, for example.

In one embodiment, the record stored by filter driver 221 subsequent to detecting a content access operation may be generated and stored in Extensible Markup Language (XML) format, although it is contemplated that in other embodiments, any suitable format may be used. One example of an XML-format record is as follows:

```
<record sequence="4">
    <path>/test1/file.xls</path>
    <type>application/vnd.ms-excel</type>
    <user id="1598">username</user>
    <group id="119">groupname</group>
    <perm>rwxrwxr-x</perm>
    <md5>af662188a09d0b9998f710d744918bfe</md5>
    <size>15360</size>
    <date sec="1055278487">2003-06-10T20:54:47Z</date>
    <io>
        <write>append</write>
    </io>
    <process>
        <name>smbd</name>
        <args>/opt/VRTSsamba/bin/smbd -D
         -s/opt/VRTSsamba/lib/smb.conf</args>
        <pid>393</pid>
        <ppid>376</ppid>
        <pgrpid>376</pgrpid>
    </process>
</record>
```

Such a record may be appended to the named stream (for example, named stream 320a) associated with the file (for example, file 310a) having the file identity "/test1/file.xls" subsequent to an appending write operation. In this case, the number associated with the "record sequence" field indicates that this record is the fourth record associated with file 310a. The "path" field includes the file identity, and the "type" field indicates the file type which in one embodiment may be provided by the process issuing the file create operation, and in other embodiments may be determined from the extension of the file name or from header information within the file, for example. The "user id" field records both the numerical user id and the textual user name of the user associated with the process issuing the file create operation, and the "group id" field records both the numerical group id and the textual group name of that user. The "perm" field records file permissions associated with file 310a in a format specific to the file system 205 and/or the operating system. The "md5" field records an MD5 signature corresponding to the file contents, and the "size" field records the length of file 310a in bytes.

Additionally, the "date" field records the date and time the record was created. The "io" field records information about the type of content access operation performed, and may include subfields specific to the operation type such as "read" and/or "write"; the "write" subfield may further delimit information regarding the type of write, such as "append" or "random." The "process" field may include subfields recording information about the process performing the content access operation. The "name" subfield records the name of the process, and the "args" subfield records the arguments given when the process was invoked. The "pid," "ppid," and "pgrpid" subfields record the process ID, the ID of the parent of the process, and the group ID of the process, respectively. It is contemplated that in alternative embodiments, filter driver 221 may store records corresponding to content access operations that include more or fewer fields, as well as fields having different definitions and content.

It is noted that in some embodiments, file system 205 may be configured to store records subsequent to detecting file content access operations, as just described, whereas in other embodiments, file system 205 may be configured to store records subsequent to detecting file identity-modifying operations as described above in conjunction with the description of FIG. 3. It is contemplated that in still other embodiments, file system 205 may be configured to store records corresponding to both content access operations and identity-modifying operations subsequent to detecting each respective type of operation. In one such embodiment, both types of records may be stored within a single named stream 320 corresponding to the file operated on, while in another such embodiment, each type of record may be stored in a distinct named stream corresponding to the file operated on. Further, in some embodiments storing both types of records, all stored records may follow the conventions described above for identity-modifying operations regardless of record type. For example, all stored records associated with a source file may be copied to the named stream of a destination file in the event of a file copy operation, and all stored records associated with a given file may be marked as "old" subsequent to that file changing identity, such as due to a file rename operation as described above.

History Stream and File Mutation Database

In the illustrated embodiment, file system 205 includes history stream 330, which may be exemplary of history stream 330 of FIG. 3 and described in detail above. In some embodiments, filter driver 221 may be configured to store a record in history stream 330 in response to storing a record corresponding to a content access operation in a given named stream 320. For example, in response to storing a record subsequent to detecting an operation to access the content of a file 310 as described above, filter driver 221 may store a record indicative of the operation in history stream 330 as well as the identity of the file operated on. History stream 330 may thereby provide a centralized history of the content access operations transpiring within file system 205.

As noted above, in one embodiment the record stored by filter driver 221 in history stream 330 may be generated in Extensible Markup Language (XML) format, although it is contemplated that in other embodiments, any suitable format may be used. Referring to the example above in which file 310a "/test1/file.xls" underwent an appending write operation, in one embodiment history stream 330 may include the following example record subsequent to the appending write operation:

```
<record>
    <op>append_write</op>
    <path>/test1/file.xls</path>
</record>
```

In this example, as in the previous history record example, the "op" field of each record indicates the operation performed, while the "path" field indicates the file identity of the file 310a operated on. It is contemplated that in alternative embodiments, filter driver 221 may store within history stream 330 records including more or fewer fields, as well as fields having different definitions and content. For example, in one embodiment records corresponding to all types of write content access operations (e.g., appending and random) may be indicated simply as "modify" records within history stream 330 such as shown in the previous history record example.

Update daemon 350 may be exemplary of update daemon 350 of FIG. 3, described in detail above. As in that embodiment, update daemon 350 may be configured as a kernel-mode or user-mode process operating within file system 205 that may scan the records stored in history stream 330 at regular or irregular intervals. If a valid record is found, then for each destination file 310 recorded in the history stream (i.e., the file identified by the "path" field in the above example), update daemon 350 may be configured to access the corresponding named stream 320, and to convey the records stored therein to file mutation database 340. As described in detail above, update daemon 350 may be configured to convey all records stored in the corresponding named stream 320, or only records newly created since the named stream 320 was last accessed by update daemon 350.

As in the embodiment of FIG. 3, it is noted that in an alternative embodiment, history stream 330 may be omitted from file system 205. In such an embodiment, update daemon 350 may be configured to scan all named streams 320 within file system 205 at regular or irregular intervals, conveying all or only modified records to file mutation database 340. Further, in another alternative embodiment, both history stream 330 and update daemon 350 may be omitted from file system 205. In such an embodiment, filter driver 221 may signal file mutation database 340 directly upon generating a record, such as via a software interrupt or function call, for example. Additionally, in some embodiments, filter driver 221 may be configured to store records subsequent to detected either identity-modifying operations or content access operations. As noted above, filter driver 221 may store both types of records in a single named stream 320 corresponding to a given file 310, or in separate named streams. Update daemon 350 may be appropriately configured to retrieve records from one or more named streams 320 according to each such embodiment.

In the illustrated embodiment, as for the embodiment illustrated in FIG. 3, file mutation database (FMD) 340 is a database integrated with file system 205, although it is contemplated that in other embodiments, FMD 340 may be implemented externally to file system 205. FMD 340 may be configured to store records in the same format as the records stored in named streams 320 and history stream 330, such as XML format records. However, it is contemplated that file mutation database 340 may implement any suitable database format or architecture. Further, in some embodiments, FMD 340 or update daemon 350 may be configured to convert records stored in one format within named streams 320 and history stream 330 to another format for storage within FMD 340. File system 205 may provide an API through which various processes may submit database queries to FMD 340, which may in turn be configured to respond to such queries.

Numerous types of queries of FMD 340 are possible and contemplated, dependent on the type of information included in the records of content access operations generated by filter driver 221. Such queries may be configured to classify sets of files based on how content access operations indicate that such files are used. For example, in one embodiment, the class of log files (i.e., files used to log information regarding some aspect of a system's continuing operation) may exhibit a common set of characteristics, such as having appending writes but not random writes, having far fewer reads than writes, and having writes originating from a single process group rather than multiple process groups. In such an embodiment, a query may be designed and issued to FMD 340 to identify the files 310 having records of content access operations satisfying these characteristics. Based on this and similar classifications, different storage policies for file classes may be implemented. For example, in one embodiment file system 205 may assign files identified as log files through such a query to a lower-speed class of storage device, based on the heuristic that log files are typically infrequently accessed and therefore relatively performance-insensitive. Numerous other queries corresponding to various file classes as well as storage policies for such file classes are possible and contemplated.

Figures 6A, 6B:
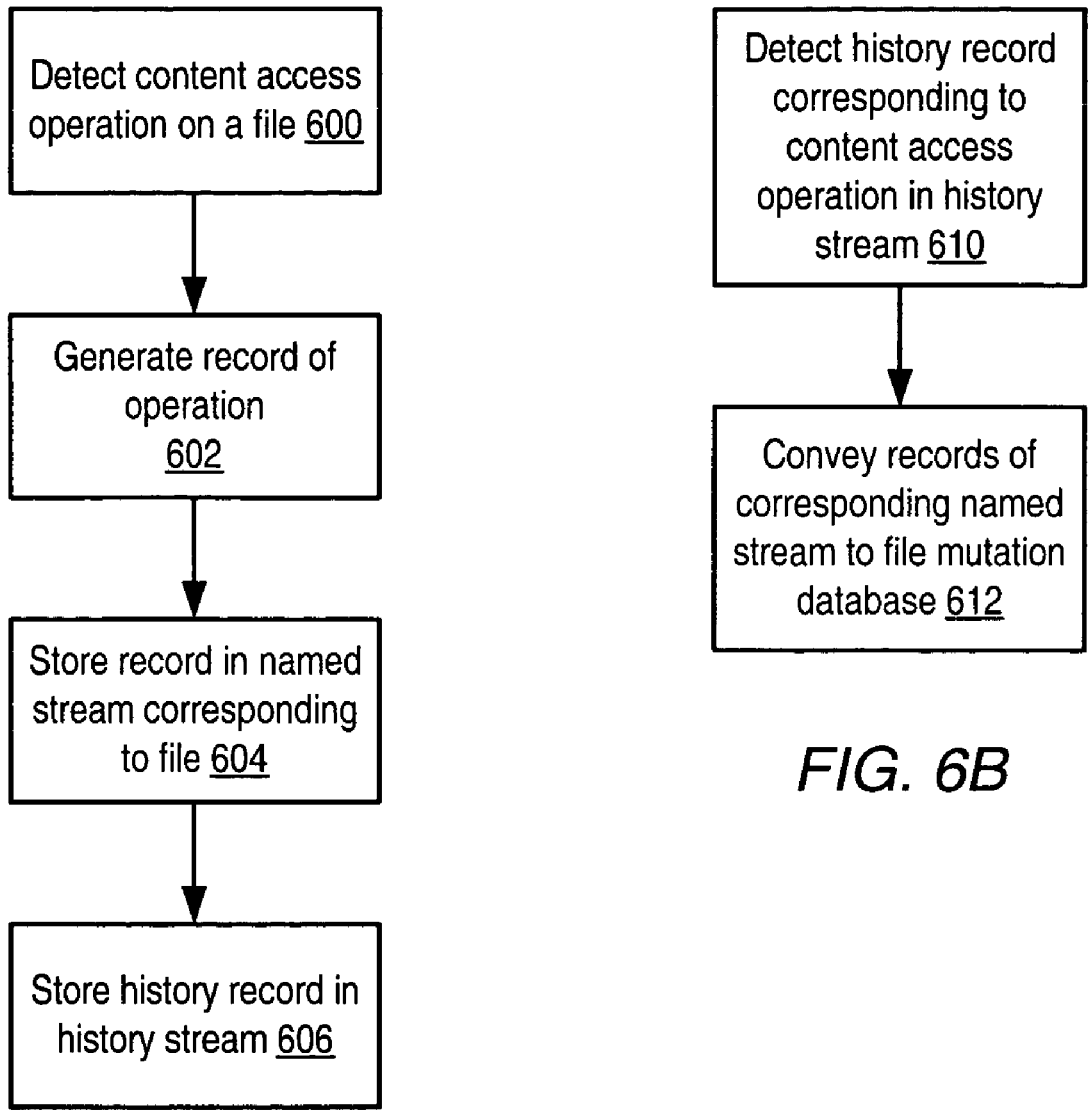
FIG. 6A is a flow diagram illustrating one embodiment of a method of generating and storing records corresponding to content access file operations.
FIG. 6B is a flow diagram illustrating one embodiment of a method of importing records corresponding to content access file operations into a file mutation database.

FIG. 6A and FIG. 6B illustrate embodiments of methods of generating and storing records corresponding to content access file operations and of importing such records into a file mutation database, respectively. Referring collectively to FIG. 1, FIG. 2, FIG. 5, and FIG. 6A, operation begins in block 600 where an operation to access content of a file is detected. In one embodiment, filter driver 221 of file system 205 may be configured to detect an content access operation as described above.

Subsequent to detection of the identity-modifying operation, a record of the operation is generated (block 602). In some embodiments, filter driver 221 may be configured to generate this record, and as described above, in some embodiments the record may be in the XML format and may include information about the operation, the file identity, a signature corresponding to the file, and other information as desired.

After the operation record is generated, it is stored in a named stream corresponding to the file (block 604). Additionally, a history record of the operation is stored in a history stream (block 606). As noted above, filter driver 221 may be configured in some embodiments to store the generated record in a named stream 320 corresponding to the file 310 targeted by the operation, and may additionally be configured to store a history record such as described above in history stream 330.

As in the case of identity-modifying operations described above, the method of FIG. 6B may in some embodiments operate in parallel to the method illustrated in FIG. 6A. For example, the method of FIG. 6B may be implemented within update daemon 350. Referring collectively to FIG. 1, FIG. 2, FIG. 5, and FIG. 6B, operation begins in block 610 where a history record corresponding to a content access operation is detected within the history stream. As described above, in one embodiment update daemon 350 may be configured to scan history stream 330 to detect history records not previously processed.

Once a history record is detected, the records stored in the named stream of the file indicated in the history record are accessed and conveyed to the file mutation database (block 612). As described above, in one embodiment update daemon 350 may be configured to access the named stream corresponding to a file indicated in the history record and convey the records included therein to file mutation database 340.

Other embodiments of these methods are possible and contemplated. For example, as noted above, in some embodiments of file system 205, history stream 330 may be omitted, and update daemon 350 may be configured to scan the entire file system to determine the presence of updated records. Also, in some embodiments update daemon 350 may be omitted and filter driver 221 may communicate directly with file mutation database 340.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a storage device configured to provide a storage space for data storage; and
   a file system configured to map a plurality of files to said storage space for storage and to manage application accesses to said storage device, wherein said file system is configured to:
   determine a signature of a first one of said plurality of files dependent upon at least a portion of said first file;
   detect an operation to access content of said first file stored on said storage device, wherein said operation is generated by an application distinct from said file system; and
   in response to detecting said operation, store a record of said operation associated with said first file, wherein said record includes said signature corresponding to said first file, information indicating a type of said operation, and information identifying said application.

2. The system as recited in claim 1, wherein said operation corresponds to a file read operation or a file write operation.

3. The system as recited in claim 1, wherein said record is stored in a named stream corresponding to said first file, wherein said file system comprises a history stream, and wherein said file system is further configured to store an indication of said operation in said history stream in response to storing said record in said named stream.

4. The system as recited in claim 1, wherein said record is stored in a database configured to store a plurality of entries, and wherein said database is further configured to respond to a query of said plurality of entries.

5. The system as recited in claim 1, wherein said record is stored in extensible markup language (XML) format.

6. The system as recited in claim 1, wherein subsequent to storing said record, said file system is further configured to associate said record with a second file in response to detecting a second operation to modify the identity of said first file, wherein said second operation corresponds to a file copy operation specifying said first file as a copy source and said second file as a copy destination.

7. The system as recited in claim 1, wherein said file system is further configured to:
   determine respective signatures of ones of said plurality of files, wherein each signature is determined dependent on at least a portion of a corresponding one of said files;
   detect respective operations to access content of said ones of said plurality of files stored on said storage device, wherein each of said operations is generated by a corresponding application distinct from said file system;
   in response to detecting each given one of said respective operations to access content of a given corresponding one of said plurality of files, store a corresponding record of said given respective operation in a named stream associated respectively with said given corresponding file within said file system, wherein said corresponding record includes said respective signature corresponding to said given corresponding file, information indicating a type of said given respective operation, and information identifying said application corresponding to said given respective operation; and
   subsequent to storing said corresponding record for said given respective operation in said named stream associated respectively with said given corresponding file, storing said corresponding record for said given respective operation in a database.

8. The system as recited in claim 7, wherein said file system is further configured to:
   submit a query to said database to identify a class including one or more of said plurality of files, wherein each member of said class has one or more corresponding records of detected operations to access content that satisfy constraints specified in said query; and
   assign a storage policy to each member of said class, wherein said storage policy is determined dependent upon said class.

9. The system as recited in claim 8, wherein said storage policy identifies a type of storage device for storing members of said class, wherein said type is determined dependent upon a characteristic of said class.

10. A method, comprising:
    a file system mapping a plurality of files to a storage space for data storage provided by a storage device, wherein said file system is configured to manage application accesses to said storage device;
    said file system determining a signature of a first one of said plurality of files dependent upon at least a portion of said first file;
    said file system detecting an operation to access content of said first file, wherein said operation is generated by an application distinct from said file system; and
    in response to detecting said operation, said file system storing a record of said operation associated with said first file, wherein said record includes said signature corresponding to said first file, information indicating a type of said operation, and information identifying said application.

11. The method as recited in claim 10, wherein said operation corresponds to a file read operation or a file write operation.

12. The method as recited in claim 10, wherein said record is stored in a named stream corresponding to said first stored file, and wherein the method further comprises said file system storing an indication of said operation in a history stream in response to storing said record in said named stream.

13. The method as recited in claim 10, wherein said record is stored in a database configured to store a plurality of entries, and wherein said database is further configured to respond to a query of said plurality of entries.

14. The method as recited in claim 10, wherein said record is stored in extensible markup language (XML) format.

15. The method as recited in claim 10, further comprising said file system associating said record with a second stored file in response to detecting a second operation to modify the identity of said first stored file, wherein said second operation corresponds to a file copy operation specifying said first file as a copy source and said second file as a copy destination.

16. The method as recited in claim 10, further comprising:
said file system determining respective signatures of ones of said plurality of files, wherein each signature is determined dependent on at least a portion of a corresponding one of said files;
said file system detecting respective operations to access content of said ones of said plurality of files stored on said storage device, wherein each of said operations is generated by a corresponding application distinct from said file system;
in response to detecting each given one of said respective operations to access content of a given corresponding one of said plurality of files, said file system storing a corresponding record of said given respective operation in a named stream associated respectively with said given corresponding file within said file system, wherein said corresponding record includes said respective signature corresponding to said given corresponding file, information indicating a type of said given respective operation, and information identifying said application corresponding to said given respective operation; and
subsequent to storing said corresponding record for said given respective operation in said named stream associated respectively with said given corresponding file, said file system storing said corresponding record for said given respective operation in a database.

17. The method as recited in claim 16, further comprising:
said file system submitting a query to said database to identify a class including one or more of said plurality of files, wherein each member of said class has one or more corresponding records of detected operations to access content that satisfy constraints specified in said query; and
said file system assigning a storage policy to each member of said class, wherein said storage policy is determined dependent upon said class.

18. The method as recited in claim 17, wherein said storage policy identifies a type of storage device for storing members of said class, wherein said type is determined dependent upon a characteristic of said class.

19. A tangible, computer-accessible storage medium comprising program instructions, wherein the program instructions are computer-executable to implement:
a file system mapping a plurality of files to a storage space for data storage provided by a storage device, wherein said file system is configured to manage application accesses to said storage device;
said file system determining a signature of a first one of said plurality of files dependent upon at least a portion of said first file;
said file system detecting an operation to access content of said first file, wherein said operation is generated by an application distinct from said file system; and
in response to detecting said operation, said file system storing a record of said operation associated with said first file, wherein said record includes said signature corresponding to said first file, information indicating a type of said operation, and information identifying said application.

20. The computer-accessible storage medium as recited in claim 19, wherein said operation corresponds to a file read operation or a file write operation.

21. The computer-accessible storage medium as recited in claim 19, wherein said record is stored in a named stream corresponding to said first stored file, and wherein said program instructions are further computer-executable to implement said file system storing an indication of said operation in a history stream in response to storing said record in said named stream.

22. The computer-accessible storage medium as recited in claim 19, wherein said record is stored in a database configured to store a plurality of entries, and wherein said database is further configured to respond to a query of said plurality of entries.

23. The computer-accessible storage medium as recited in claim 19, wherein said record is stored in extensible markup language (XML) format.

24. The computer-accessible storage medium as recited in claim 19, wherein said program instructions are further computer-executable to implement said file system associating said record with a second stored file in response to detecting a second operation to modify the identity of said first stored file, wherein said second operation corresponds to a file copy operation specifying said first file as a copy source and said second file as a copy destination.

25. The computer-accessible storage medium as recited in claim 18, wherein the instructions are further executable to implement:
said file system determining respective signatures of ones of said plurality of files, wherein each signature is determined dependent on at least a portion of a corresponding one of said files;
said file system detecting respective operations to access content of said ones of said plurality of files stored on said storage device, wherein each of said operations is generated by a corresponding application distinct from said file system;
in response to detecting each given one of said respective operations to access content of a given corresponding one of said plurality of files, said file system storing a corresponding record of said given respective operation in a named stream associated respectively with said given corresponding file within said file system, wherein said corresponding record includes said respective signature corresponding to said given corresponding file, information indicating a type of said given respective operation, and information identifying said application corresponding to said given respective operation; and
subsequent to storing said corresponding record for said given respective operation in said named stream associated respectively with said given corresponding file, said file system storing said corresponding record for said given respective operation in a database.

26. The computer-accessible storage medium as recited in claim 25, wherein the instructions are further executable to implement:
said file system submitting a query to said database to identify a class including one or more of said plurality of files, wherein each member of said class has one or more corresponding records of detected operations to access content that satisfy constraints specified in said query; and
said file system assigning a storage policy to each member of said class, wherein said storage policy is determined dependent upon said class.

27. The computer-accessible storage medium as recited in claim 26, wherein said storage policy identifies a type of storage device for storing members of said class, wherein said type is determined dependent upon a characteristic of said class.

* * * * *